United States Patent [19]
Kardashian

[11] 3,723,988
[45] Mar. 27, 1973

[54] ANISOTROPIC THIN FILM PLATED WIRE LINE SENSOR

[75] Inventor: Vahram S. Kardashian, Plymouth Village, Minn.

[73] Assignee: Honeywell Inc., Minneapolis, Minn.

[22] Filed: Nov. 4, 1971

[21] Appl. No.: 195,690

[52] U.S. Cl. ................340/258 R, 324/41, 340/38 L
[51] Int. Cl. ............................................G08b 13/24
[58] Field of Search..340/258 R, 258 C, 38 L; 324/8, 324/41

[56] References Cited

UNITED STATES PATENTS

| | | |
|---|---|---|
| 1,696,230 | 12/1928 | Gilbert............................340/258 R |
| 3,434,047 | 3/1969 | Brickner..........................340/38 L X |
| 3,458,802 | 7/1969 | Koerner.................................324/41 |
| 3,508,238 | 4/1970 | Baker.............................340/258 C |
| 3,611,341 | 10/1971 | Craig et al. .......................340/258 R |
| 3,617,890 | 11/1971 | Kurauchi et al...............340/258 C X |

Primary Examiner—David L. Trafton
Attorney—Lamont B. Koontz et al.

[57] ABSTRACT

An electrically conductive wire is plated with a thin film of a magnetically anisotropic substance. A plurality of coils are placed around the wire at different points along its length. Either the wire or the coils are energized by an alternating current, and the signal developed on the other is monitored to detect intrusion of a magnetic body into the vicinity.

4 Claims, 3 Drawing Figures

Patented March 27, 1973 3,723,988

INVENTOR.
VAHRAM S. KARDASHIAN
BY Omund R. Dahle
ATTORNEY.

ANISOTROPIC THIN FILM PLATED WIRE LINE SENSOR

In the prior art of line sensors for surveillance of large areas to protect against intruders, there has been disclosed a pair of alike loops which sense equal but spaced apart components of that portion of the magnetic field characterizing the earth's surface. These alike loops are connected in series opposition to the signal detecting circuit means. A limitation of that type of line sensor intruder detector is that extreme care is required to make sure that each of the loops, which may extned over several hundreds of feet, is buried to be just alike the other loop.

In the present invention, the plated wire cable may be more easily put down than in the prior art since a loop of wire is not involved. This invention relates to a magnetic line sensor which senses changes in magnetic field anywhere along a length of an anisotropic thin film plated wire unit which is buried or laid around an area where surveillance for the intrusion of a ferromagnetic body is needed.

DETAILED DESCRIPTIONS

Figure 1:
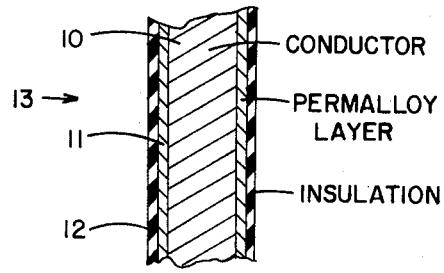
FIG. 1 is a cross section view of a section of plated wire.

Referring now to FIG. 1, there is shown a section of plated wire 13, such as is known in the art, having in one specific instance a 5 mil diameter Beryllium-Copper substrate wire 10 which has been plated with an anisotropic magnetic permalloy film 11 of approximate composition of 80 per cent Ni and 20 per cent Fe. During deposition of the ferromagnetic film, a magnetic field is applied so that a preferred axis, called the easy axis, is obtained which is oriented circumferentially about the wire. The magnetization vector may lie along this line in the absence of external fields and make a closed loop of magnetic flux around the wire. The axis perpendicular to the easy axis is called the hard axis, and its direction is along the wire. The exterior surface of the plated wire is coated with a layer of suitable insulation 12 or the plated wire is inserted inside an insulating jacket. The plating 11 provides the medium which is disturbed by the ambient magnetic field as well as its variations. The wire may act as its own pickup, that is, it develops an induced voltage or it may conduct the AC drive current.

Figure 2:
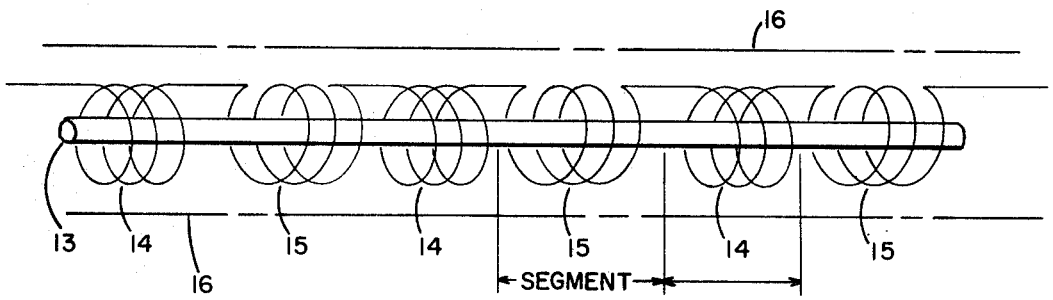
FIG. 2 shows an extended length of plated wire having spaced apart windings wound thereon.

FIG. 2 shows a piece of an extended length of the plated wire 13 which may in total extend a considerable length such as ten to one hundred feet or more. At intervals along the length of the plated wire are wound coils of wire 14 (not plated wire) around the plated wire, these coils 14 being wound in a first direction. At intermediate intervals along the wire between the coils 14 are similar coils 15, these coils being wound in the opposite direction from coils 14, the plurality of coils 14 and 15 being connected in a series circuit. Thus at each successive coil, the windings reverse direction. A length of plated wire with its coil is herein identified as a segment and the extended length of plated wire and coils form a sensing unit. As an example, a segment, i.e., the distance between a coil 14 and a coil 15 may be in the order of inches to several feet. A grounded electrostatic shield 16 encases the plated wire and coils over its length.

Figure 3:
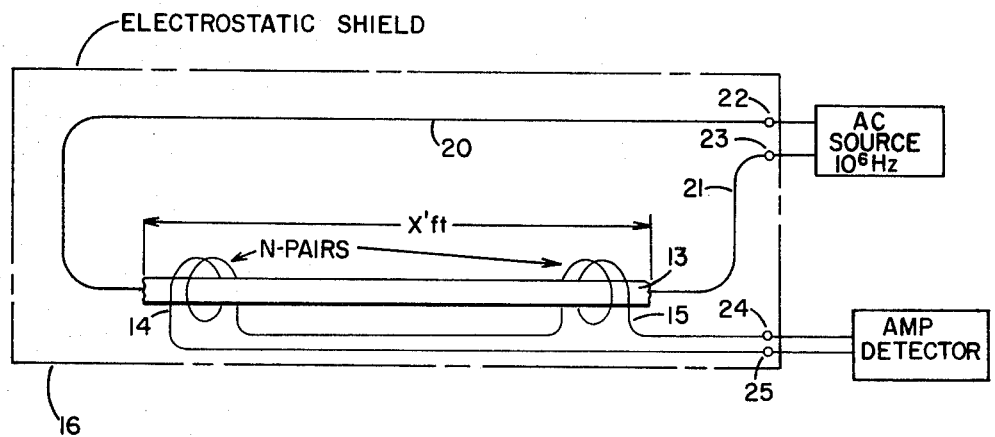
FIG. 3 discloses a line sensor intruder detector system.

FIG. 3 schematically shows the line sensor system comprising the extended unit of plated wire with its multiple coils, a high frequency oscillator source, and an amplifier detector. In this figure, the extended length of plated wire 13 with its multiple coils 14 and 15 is foreshortened for simplicity of drawing so the multiple coils 14 and 15 have also been simplified by showing only one pair of the multiple coils in the actual system. The series circuit formed with coils 14 and 15 may be energized from a high frequency alternating current source of a frequency such as a megahertz, for example, or in the alternative the series circuit formed with the plated wire 13 and the conductors 20 and 21 may be energized from the high frequency alternating current source, as is shown in FIG. 3. This drive current which drives either the coils or the plated wire may be from an oscillator providing an oscillating current of constant frequency and constant amplitude. The oscillator drive frequency is matched to the resonant frequency of the drive circuit element, be it the plated wire or the set of coils. This drive current applies antiparallel fields $H_d$ in the plated wire. The terminals of the plated wire are connected by conductors 20 and 21 to an amplifier-detector processing system to measure the output signal when the oscillator is connected to the coils. Conversly, when the oscillator is connected to the plated wire, the coils 14 and 15 become the output and are connected to the amplifier detector processing system. Both the plated wire and the drive coils are electrostatically shielded from electric fields by the metallic shield 16.

If the oscillator is connected to terminals 22 and 23 to drive the plated wire 13, the oscillating current generates an oscillating magnetic field along the easy axis of the plated wire.

If the oscillator is connected to terminals 24 and 25 to drive the coils 14 and 15, the oscillating current generates an oscillating magnetic field along the hard axis of the plated wire.

In either case, the oscillating magnetic field causes the magnetization vector of the anisotropic permalloy film to oscillate about an equilibrium orientation. The oscillating magnetization vector generates a voltage in the coils 14 and 15 when the plated wire has been excited by the oscillator. If the oscillator is connected to the coils a voltage is generated in the plated wire.

The voltages generated in two adjacent segments of the plated wire are of opposite polarity and are equal in magnitude if the ambient magnetic field is identical for the two adjacent segments, and are unequal in magnitude if the ambient magnetic field over one segment is unequal to that of the adjacent segment. Thus, under quiescent conditions, when the ambient magnetic field is identical for the adjacent segments the opposing voltages cancel each other or null out. This also means that general changes in the ambient magnetic field affect each segment alike and are nulled out and not detected. Any non-nulled voltage output of two adjacent segments is a measure of the difference in ambient magnetic field over the two segments. The ambient magnetic field consists of variations of magnetic field superposed over a constant magnetic field. Two adjacent segments, therefore, act as a gradiometer since they effectively measure one component of the gradient of a magnetic field.

If a magnetic body is carried into the proximity of the line sensor it will impose on the segments unequal disturbing magnetic fields. Thus, for example, if a soldier carrying a rifle approaches the line sensor it will impose on the adjacent segments unequal disturbing magnetic fields. The magnetic field disturbance may be regarded as quasisinusoidal having a frequency range from near DC to 10 Hz or more, depending upon the movement of the magnetic body. The amplifier detector signal processing system will have filter means or the like to select the range of frequencies of interest. The lineal coverage range of the line sensor, i.e., the perimeter to be guarded, can be extended by connecting a plurality of line units electrically in parallel to the driver and amp-detector but physically end to end.

The embodiments of the invention in which an exclusive property or right is claimed are defined as follows:

1. A line sensor intrusion detection system which senses local changes in magnetic field strength along an area to be protected, the system comprising:

an extended length of anisotropic thin film plated wire;
a first pair of terminals being connected to provide a circuit through said plated wire;
a plurality of spaced coils of wire wound around said extended length of plated wire, the sequential coils of wire along said length having one coil wound in a first direction followed by the next coil sound in the opposite direction;
means connecting said plurality of coils in a series circuit to a second pair of terminals;
a source of high frequency alternating current;
means connecting said source of high frequency alternating current to one pair of said first and second pair of terminals to excite said line sensor and thereby to cause an output signal at the other pair of said first and second pair of terminals;
signal detector processing means;
and means connecting said signal detector processing means to said other pair of terminals to receive said output signal.

2. The invention in accordance with claim 1 wherein said source of high frequency alternating current is connected to said plated wire at said first terminals and said signal detector processing means is connected to said plurality of coils at said second terminals.

3. The invention in accordance with claim 1 wherein said source of high frequency alternating current is connected to said plurality of coils at said second terminals and said signal detector processing means is connected to said plated wire at said first terminals.

4. The invention in accordance with claim 1 in which said plated wire comprises a Beryllium-Copper substrate wire coated with an anisotropic thin film of Ni-Fe.

* * * * *